Patented Feb. 13, 1945

2,369,308

UNITED STATES PATENT OFFICE 2,369,308

STABILIZED ICE COLOR COMPOSITIONS

Paul P. McClellan, Old Greenwich, and Walter P. Ericks, Cos Cob, Conn. assignors to American Cyanamid Company, New York, N. Y., a corporation of Maine No Drawing. Application August 30, 1941, Serial No. 409,062

8 Claims. (Cl. 8—45)

This invention relates to a new class of chemical compounds, to intermediates and dyes obtained therefrom, and to their methods of preparation.

The principal object of this invention is to prepare new stabilized diazo compounds, preferably those soluble in water and in the more commonly used organic solvents.

Among the stabilized diazo compounds included herein are, more especially, the reaction products of an ice color diazo component with an alkylol or an alkoxyalkylol derivative of guanidine. Inasmuch as these derivatives each exist in several tautomeric forms, the reaction products prepared from any one may occur as a mixture of isomers which readily undergo rearrangement. Hence, assignment of a definite chemical formula is problematical.

However, the chemical properties of the products and the particular method or methods of preparation disclosed herein cause one of the isomers to appear in excess, and under the present conditions the monomeric form is produced predominantly. Thus the alkylol and alkoxyalkylol guanidine derivatives probably have the formula:

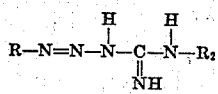

wherein R represents the nucleus of an aromatic amine such as the nucleus of an ice color diazo component; and $R_2$ is an alkylol or alkoxyalkylol group.

These stabilized diazo compounds are resistant to percussion and even when heated in a direct flame decompose without the hazard of an explosion. When in a dry condition or in an alkaline solution they are stable at temperatures normally encountered throughout all seasons of the year, and hence may be stored indefinitely. However, these reaction products possess the property of splitting into their original components by treatment with acids at elevated temperatures or with steam containing volatile acid vapors. If this splitting occurs in the presence of an ice color coupling component the regenerated active diazotized component becomes available immediately for reaction with the coupling component and produces the corresponding azo pigment or dye.

To this end it is a further object of this invention to prepare new azo pigments and dyes by mixing an ice color coupling component and the reaction product of an ice color diazo component with an alkylol or alkoxyalkylol derivative of guanidine. As such, the mixture may or may not be colored. However, if a textile material is printed or impregnated with this mixture and then heated in the presence of an acid, the acid hydrolyzes the stable diazo compound, splitting it into its components; and the regenerated diazotized component liberated couples with the ice color component to form an azo pigment or dye.

This acid treatment or ageing as it is called, is preferably effected with a weak acid and at an elevated temperature. Usually formic or acetic acids are used, but various other acids as well as substances liberating acids upon being steamed such as ammonium sulfate, esters of tartaric, succinic, etc., acids may be used particularly when the printed material is subjected to a subsequent steam treatment to effect ageing or develop the color.

Stable alkaline printing pastes can be prepared from the mixture of the ice color coupling component and the reaction product of the ice color diazo component with one of the alkylol or alkoxyalkylol derivatives by dissolving the mixture in a solvent such as water, alcohol, acetone, etc., together with various other ingredients such as alkalies, organic bases, impregnating agents, thickeners such as starch, gum, etc., well known to those skilled in the art. Cotton goods can be printed with this paste with the aid of a copper roll. The print is then dried and subsequently the desired color is developed by steaming in the presence of acetic acid or other volatile acid vapors. In this manner an insoluble azo pigment is produced in and on the cotton fibers in the form of the printed pattern. Such prints are bright and possess remarkable fastness to light and washing.

The facility with which the compounds and dyes included in this invention can be used is based upon the ease with which the stabilized diazamino group present can be split and converted into an active diazo group by heating in the presence of an acid or an acid liberating substance. This conversion or ageing is usually effected in a steam chamber and in the presence of a coupling component (e. g. naphthol in the examples given below) to develop or form the color.

The following examples describe the preparation of several stabilized diazo compounds included in this invention and further give details as to their use in dyeing and printing textile materials.

EXAMPLE I

*Monoethylol guanidine reacted with p-toluidine diazonium hydrochloride*

An aqueous solution of monoethylol guanidine was prepared by introducing 23.4 g. of guanidine carbonate into a dilute sulfuric acid solution. The sulfates were precipitated out by the addition of sufficient barium hydroxide and filtered off. The filtrate was cooled to 5° C. with ice and .04 g. of sodium hydroxide dissolved therein. 9.5 g. of ethylene oxide was added slowly, with constant stirring and the temperature maintained at 5-10° C. After stirring for 12 hours at 10° C. a solution containing 12.4 g. of monoethylol guanidine was obtained. 30.9 g. of p-toluidine diazonium chloride was then added with stirring to 133 cc. of water containing 12.4 g. of monoethylol guanidine and the solution cooled with ice to 5° C. 14.5 g. of sodium hydroxide dissolved in 25 cc. of water and 44 g. of sodium carbonate were added. A yellow precipitate formed and was filtered off and dried at room temperature to yield a fine brown crystalline powder.

This diazo compound has the following probable formula:

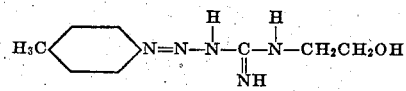

It is almost insoluble in water but readily soluble in acetone, denatured ethyl alcohol and dioxane.

Any one of a number of coupling components known to those versed in the art can be admixed with this diazo compound, such as 1-naphthol, the o-toluidide of 2,3-hydroxy-naphthoic acid, the 2,5-dimethoxy anilide of 2,3-hydroxy-naphthoic acid, or the 4-chloranilide of 2,3-hydroxy-naphthoic acid. When mixed with an alkaline aqueous alcohol solution of sodium α-naphtholate it showed a very high degree of stability and no formation of dyestuff occurred. Coupling took place immediately upon acidification of this mixture with acetic acid while heating to yield a red dye.

EXAMPLE II

*Diethylol guanidine reacted with p-toluidine diazonium hydrochloride*

An aqueous solution of diethylol guanidine was prepared by reacting 46 g. of monoethylol cyanamide prepared as described above and containing 12% water with 84.5 g. of ethylolamine hydrochloride. The reactants were heated over a period of 30 minutes to 130° C. and then at 130 to 140° C. for 10 minutes to yield 91 g. of the diethylol guanidine hydrochloride as a light yellow liquid. Then 11.5 g. of this diethylol guanidine hydrochloride was dissolved in 100 cc. of water cooled with 150 g. of ice. This solution was rendered alkaline by the addition of 5 g. of sodium hydroxide and 26.3 g. of sodium carbonate to yield the desired solution of diethylol guanidine.

7.7 g. of p-toluidine diazonium chloride was added to the above diethylol guanidine solution and the mixture stirred for an hour. A brown somewhat sticky material separated and was filtered off and dried at room temperature to yield a brown soft material.

This diazo compound has the folowing probable formula:

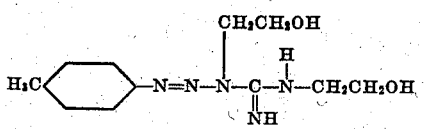

It is sparingly soluble in water but readily soluble in acetone, denatured ethyl alcohol and dioxane. When mixed with an alkaline solution of sodium α-naphtholate it was stable at room temperature but showed some coupling upon heating to 80° C. Coupling takes place readily upon acidification of the mixture with acetic acid and heating as the formation of a definite red azo dyestuff indicates.

Similarly, various other members of the alkylol and alkoxyalkylol series of derivatives of guanidine may be obtained by using as a starting material the corresponding compound containing a reactive ethylene oxide ring and a corresponding substituent in the ethylene oxide ring. Thus instead of ethylene oxide, one or more mol. of glycidol, propylene oxide, isopropylene oxide, butylene oxide, isobutylene oxide, etc. etc., can be used in order to render the stabilized diazo compound water soluble. A number of such compounds are described in the copending applications Serial Numbers 289,398 and 289,400 of Walter P. Ericks.

It is to be particularly noted that although for ease of description, the aromatic amine chosen in the examples illustrating specific embodiments of the invention was p-toluidine, various other stable diazo compounds can be prepared from practically any ice color diazo component. Thus other typical amines which can be diazotized and reacted with the stabilizing components include in addition to p-toluidine, among numerous others familiar to those versed in the art, aniline as well as homologues of aniline, namely 2,4-dimethylaniline. Where still other color variations are desired, the halogen derivatives of aniline may be used, such as the monochloroanilines, dichloranilines; anilines substituted by hydrocarbon radicals, such as alkyl, alkoxy radicals, for example methyl, ethyl, etc., methoxy, ethoxy, or the like; or anilines substituted by nitro radicals, acyl derivatives thereof, and the like.

Similarly, although 1-naphthol is given as the most frequently used coupling component for the dye mixture incorporating the specific stabilized diazo compounds, various other naphthols, such as naphthol AS, toluidides, pyrazolones, coupling arylides, particularly arylides of 2,3-hydroxynaphthoic acid, other hydroxy or amino-naphthoic acid, carbazole-carboxylic acid, hydroxyanthracene carboxylic acid, anthraquinone carboxylic acid, the anilide of 2,3-hydroxy-naphthoic acid, or the like, may be used as coupling components.

This case is a continuation-in-part of our copending application, Serial No. 369,806, filed Dec. 12, 1940.

It is to be understood that the examples herein given are merely illustrative and not limitative embodiments of this invention which is to be construed broadly and limited solely as defined by the scope of the appended claims.

We claim:

1. A color producing composition of matter which comprises an ice color coupling component and a stabilized diazo compound having the formula:

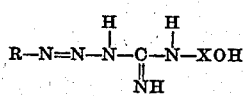

in which R is the nucleus of an ice color diazo component of the benzene series and X is a member of the group consisting of alkyl and alkoxyalkyl.

2. A color producing composition of matter which comprises an ice color coupling component and a stabilized diazo compound having the formula:

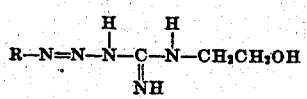

in which R is the nucleus of an ice color diazo component of the benzene series.

3. A color producing composition of matter which comprises an ice color coupling component and a stabilized diazo compound having the formula:

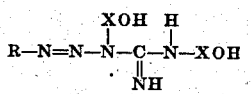

in which R is the nucleus of an ice color diazo component of the benzene series and X is a member of the group consisting of an alkyl and alkoxyalkyl.

4. A color producing composition of matter which comprises an ice color coupling component and a stabilized diazo compound having the formula:

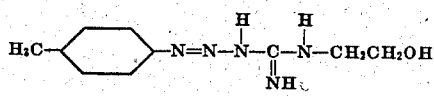

5. A color producing composition of matter which comprises an ice color coupling component and a stabilized diazo compound having the formula:

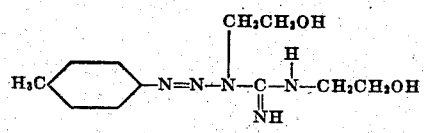

6. A method of color material comprising the application to the material of a mixture of an ice color coupling component and a stabilized diazo component having the formula:

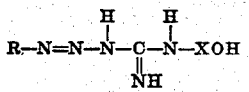

in which R is the nucleus of an ice color diazo component of the benzene series and X is a member of the group consisting of alkyl and alkoxyalkyl, and forming the color by subjecting the material to the action of a weak acid at an elevated temperature.

7. A printing paste comprising a printing thickener associated with a mixture of an ice color coupling component and a stabilized diazo compound having the formula:

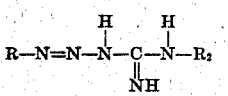

in which R is the nucleus of an ice color diazo component of the benzene series and $R_2$ is selected from the group consisting of an alkylol and an alkoxyalkylol group.

8. A color producing composition of matter which comprises an ice color coupling component and a stabilized diazo compound having the formula:

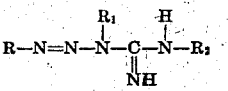

in which R is the nucleus of an ice color diazo component of the benzene series, $R_1$ is selected from the group consisting of H, alkylol, and alkoxyalkylol, and $R_2$ is selected from the group consisting of alkylol and alkoxyalkylol.

PAUL P. McCLELLAN.
WALTER P. ERICKS.